United States Patent [19]

Bigo et al.

[11] Patent Number: 5,261,099
[45] Date of Patent: Nov. 9, 1993

[54] SYNCHRONOUS COMMUNICATIONS SCHEDULER ALLOWING TRANSIENT COMPUTING OVERLOADS USING A REQUEST BUFFER

[75] Inventors: Firmin Bigo; Victor Spagnol, both of Cagnes-sur-Mer, France

[73] Assignee: International Business Machines Corp., Armonk, N.Y.

[21] Appl. No.: 908,621

[22] Filed: Jun. 29, 1992

Related U.S. Application Data

[63] Continuation of Ser. No. 410,167, Sep. 20, 1989, abandoned.

[30] Foreign Application Priority Data

Aug. 24, 1989 [EP] European Pat. Off. ........ 89480129.9

[51] Int. Cl.⁵ .................. G06F 13/372; G06F 13/24
[52] U.S. Cl. ................... 395/650; 364/271; 364/271.5; 364/281.3; 364/281.8; 364/284.1; 364/239.2; 364/242.2; 364/DIG. 1; 364/939.4; 364/939.5; 364/939.6
[58] Field of Search ............... 395/650, 700, 200

[56] References Cited

U.S. PATENT DOCUMENTS

| | | | |
|---|---|---|---|
| 4,044,337 | 8/1977 | Hicks et al. | 364/200 |
| 4,458,316 | 7/1984 | Fry et al. | 364/200 |
| 4,782,442 | 11/1988 | Kojima et al. | 395/650 |
| 4,783,734 | 11/1988 | May et al. | 395/650 |
| 4,800,521 | 1/1989 | Carter et al. | 395/650 |
| 4,802,115 | 1/1989 | Ginn | 395/650 |
| 4,809,168 | 2/1989 | Hennessy et al. | 395/650 |
| 4,833,598 | 5/1989 | Imamura et al. | 395/650 |
| 4,833,638 | 5/1989 | Vollaro | 395/650 |
| 4,847,754 | 7/1989 | Obermarck et al. | 395/650 |
| 4,852,001 | 7/1989 | Tsushima et al. | 395/650 |
| 4,853,845 | 8/1989 | Zimmer et al. | 364/200 |
| 4,888,691 | 12/1989 | George et al. | 364/300 |
| 4,916,607 | 4/1990 | Teraichi et al. | 395/650 |
| 4,954,948 | 9/1990 | Hira et al. | 395/650 |
| 4,956,771 | 9/1990 | Neustaedter | 395/650 |
| 5,168,566 | 12/1992 | Kuki et al. | 395/600 |

OTHER PUBLICATIONS

IBM Technical Disclosure Bulletin, vol. 28, No. 9, Feb. 1986, pp. 4001-4003, Armonk, N.Y., "Asynchronous Task Scheduling".

IBM Technical Disclosure Bulletin, vol. 15, No. 4, Sep. 1972, pp. 1351-1352; D. H. Norton, Jr., "Table-driven Task Scheduling Technique".

Information Processing 71, Proceedings of the International Federation for Information Processing, Ljubljana, Yugoslavia, Aug. 23rd-28th, 1971, pp. 494-497, North-Holland Publishing Co., Ltd., J. Olszewski, "On a Structure of Operating System Schedulers".

*Primary Examiner*—Thomas C. Lee
*Assistant Examiner*—Peter Y. Wang
*Attorney, Agent, or Firm*—Edward H. Duffield

[57] ABSTRACT

Fast scheduling mechanism of tasks to be performed in a communication system, like a modem, and the scheduler for implementing the mechanism.

The communication system receives, synchronously to a rate determined by a high priority program, data to be processed by the tasks of a lower priority main program.

Instead of scheduling the tasks immediately upon requests generated by an interrupt program, said tasks are scheduled with a controled delay relatively to their corresponding requests. Thus, free processing windows are created for execution of asynchronous tasks or synchronous transient overloads. Overall, more synchronous and asynchronous tasks can be performed without increasing processing power.

12 Claims, 12 Drawing Sheets

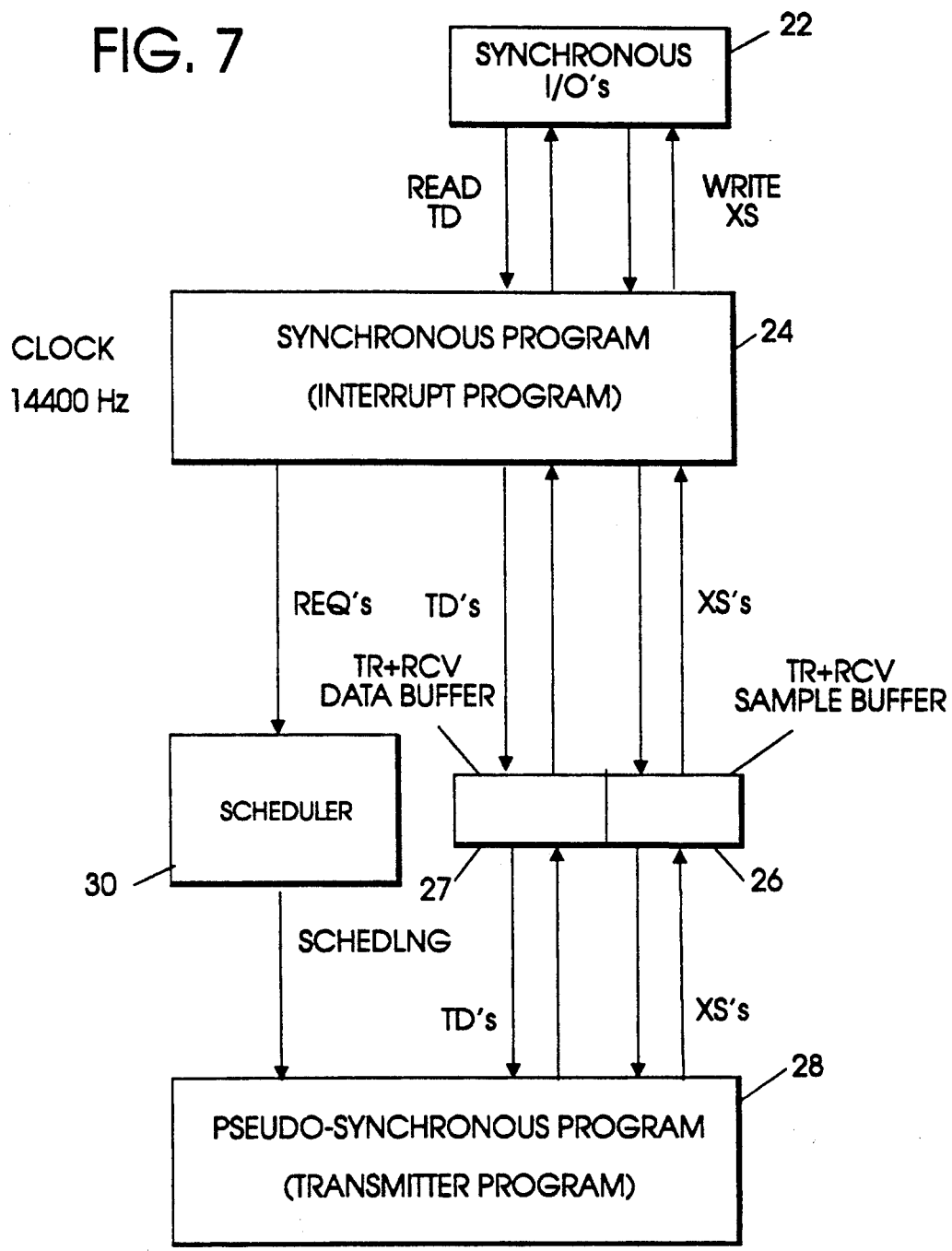

SYNCHRONOUS COMMUNICATIONS SCHEDULER ALLOWING TRANSIENT COMPUTING OVERLOADS USING A REQUEST BUFFER

CROSS REFERENCE TO RELATED APPLICATIONS

This application is a continuation of U.S. Ser. No. 07/410,167, filed Sep. 20, 1989, now abandoned.

DESCRIPTION OF THE INVENTION

1. Field of the Invention

This invention relates to a program scheduling mechanism and a scheduler for implementing said mechanism. It is to be used in communication systems including microcode composed of programs having different priority levels. Although the invention may be applied to a variety of communication systems, it will be more specifically described in relation to modems, which provide an advantageous application for it. When applied to modems, the scheduler according to the invention has to dispatch and to keep the overall synchronism between the high priority or interrupt programs and the lower priority or main programs.

2. Background Art

The overall structure of modem microcode, as it is well-known and schematized in FIG. 1, consists on the one hand of a main program including different modules: schedulers which dispatch the tasks according to the availability of the processor, transmitter/receiver modules, monitoring module, Control Network Management (CNM) modules etc . . . , and on the other hand of interrupt programs which contain modules to be executed, upon reception of interrupts generated by a Phase Locked Oscillator (PLO), with the highest priority, since they involve information that is continuously incoming from or outgoing to the lines connecting the communication system or modem to the rest of a network: DTEs (terminals), Hosts, Communications Controllers . . .

While the modem is active, the modules of the main program and especially the Transmitter and Receiver programs are request-driven, i.e. they are given the control by the scheduler when a specific request bit is found on. The scheduler is the program which is in charge of the time-sharing between all the program parts of the main program, which have to be executed sequentially since the modem processor is a serial processor. And a request bit is a bit set by a module of the Interrupt program to signal an event to the module of the main program which is to be executed further to the corresponding request.

Periodically, at a frequency derived from a PLO, the Interrupt program interrupts the Main program, executes a short process consisting mainly of synchronous I/O services then gives the control back to the Main program, which works on data previously provided or requested by the I/O services.

Other parts of the Main program such as CNM, Operator Panel support, Line switching, on-line tests, etc . . . called 'Asynchronous' programs, share the remaining computing power not used by the Interrupt, Transmitter and Receiver programs. Asynchronous tasks may be scheduled by a dedicated program scheduler, known per se, which in addition cuts them down into short modules to be executed after the modules of the synchronous main program, and manages their break and return points.

In conventional modems working with moderate line speeds (9600 or 14400 bits per second), the computations to be performed by the modules of the Main program (A/D or D/A conversion, computation of signal samples . . . ) are made all the time in synchronism with the data provided by the lines or to be fed to them by means of the transmitter/receiver Interrupt programs. However, as soon as a task which is longer than the delay between two interrupts occurs, the execution of the Main program becomes late relatively to the interrupt program, and an overrun situation occurs.

This problem becomes even more dramatic when the line speed is increased to 19200 bps, since more bits of information have to be treated in a given period of time, while the computation algorithms become much more complex when compared to those used in a modem working at 9600 or 14400 bps. Thus, if the performance of the processor cannot be increased for technological or economical reasons, and if the buffering space of the data coming from or going to the lines must remain limited, in order to keep a limited transit time, which is the case in a modem, a bottleneck is reached, wherein the processor is rapidly overwhelmed by the amount of data handled by the synchronous Interrupt programs. Thus over a long period, the amount of time left for the execution of the main program reveals too short, which again characterizes an overrun situation, i.e. the delay between the setting by the Interrupt program, of a task execution request and the related task execution by the main program is too long. This is a catastrophic error is a modem, because it leads after a while to a situation wherein all the data provided by the modem have lost any meaning.

OBJECTS OF THE INVENTION

An object of the present invention is to provide a scheduling mechanism and a scheduler implementing said mechanism which solves the problem linked to the prior art as explained above, i.e. a mechanism that provides for the proper scheduling of the microcode tasks, thereby transforming transient computing overloads into a computing load that is better partitioned over the time without affecting too much the computing load of the processor.

Another object of the present invention is to allow to execute the modules of the Main program, especially the computing of samples, pseudo-synchronously, i.e. within a limited and transient delay in regard of the request generated by the Interrupt program when asking for execution of said modules or tasks of the Main program. This implies that the late execution of a task relatively to the corresponding request should not result into an overrun situation, as long as the task is executed within said limited delay.

A further object of the invention is to allow the detection of an overrun, should such an overrun nevertheless happen.

SUMMARY OF THE INVENTION

In its basic principle, the invention consists in accepting, between a first high priority program (called Interrupt program) working in synchronism with the line rate and a second program (called Main program) having a lower priority and working with the information provided by said first program, a controlled transient loss of synchronism, equivalent to pseudo-synchronism, being understood that the maximum transient delay authorized between said first and said second programs is determined as a function of the mean processing load of the communication system processor, and of the transit delay which can reasonably be accepted for formation being transmitted through the communication system.

When applied to a communication system wherein data is received from the outside, for instance from a Data Terminating Equipment (DTE), by a synchronous Interrupt (i.e. high priority) program which stores it into a data buffer for later processing by a pseudo synchronous Main program (having relatively a lower priority level), the invention as claimed is characterized by a scheduling mechanism and a scheduler for implementing said mechanism, said scheduling mechanism including the steps of:

buffering into buffer means a limited set of received data, at a rate synchronous to said high priority program;

generating sequential processing requests corresponding to the tasks to be performed on the respective sets of buffered data, and scheduling the sequential pseudo-synchronous execution of the requested tasks so that a given task to be executed with a controlled delay relatively to the corresponding processing request, thereby creating free processing windows for the execution of other transient tasks.

BRIEF DESCRIPTION OF THE DRAWINGS

The invention will be more easily understood in relation to the drawings, wherein:

FIG. 7 represents the general structure needed in a communication system for implementing the principle according to the invention.

DETAILED DESCRIPTION OF THE INVENTION

Although the invention may be applied to any communication system wherein two or more programs having different priority levels work in synchronism at a rate derived from the communication line rate, it will more specifically be described in the context of its application to a modem, without, however, affecting the generality of the invention.

Figure 1:
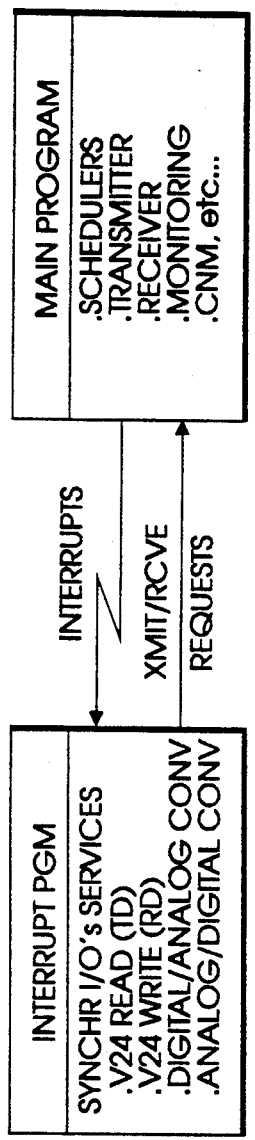
FIG. 1 represents the overall structure of a known modem microcode.

As already explained above, FIG. 1 represents the overall structure of the microcode generally encountered in modems, the important fact being the separation between an "interrupt type" program and a main program. The Interrupt program is a high priority program related to Input/Output services. This kind of program has the highest priority within the modem microcode since the information received from a DTE must be taken into account, processed and transmitted to the network lines rapidly enough to confer a good throughput to the modem. Similarly, the information received by the modem at a line rate of for instance 19200 bps, must be taken into account immediately in order to begin the analog/digital conversion and subsequent signal processing as soon as possible.

Therefore, the interrupt program generates an interrupt signal which stops the execution of the main program working on information previously received by the modem, and gives the control to a high priority program segment (described farther). At the end of the segment initiated by the Interrupt program, the Main program restarts the execution from the break point. It is to be noted that the Main program contains Receiver and Transmitter modules which are executed pseudo-synchronously relatively to the line synchro, since the information on which they work must first have been received from the line or respectively received from DTE interface transmitted by the synchronous modules or segments of the Interrupt program. The Main program further contains Monitoring, CNM modules etc . . . which work totally asynchronously with respect to the line rate. If there is processing time left between two consecutive main program tasks, such a free processing window is used by the scheduler program to have the low priority asynchronous tasks extended.

In order to enable a clearer understanding of the problem encountered in the prior art and solved by the present invention, the microcoded transmission function (from V24 interface from a Data Terminating Equipment DTE to a telephone line through a modem) and a transmit process cycle will now be described in greater detail, in relation to FIGS. 2, 3 and 4. The reception function (i.e. from line to DTE, through modem) could be similarly described, but since the reception is symetric to the transmission (as appears from FIG. 2) it will not be discussed in detail herein. It is simply to be noted that the terms Transmit data, Digital to Analog converter, Transmit signal samples, . . . mentioned in the Transmit function description become respectively Receive data, Analog to Digital converter, Receive signal samples, . . . in the Receive function.

Figure 2:
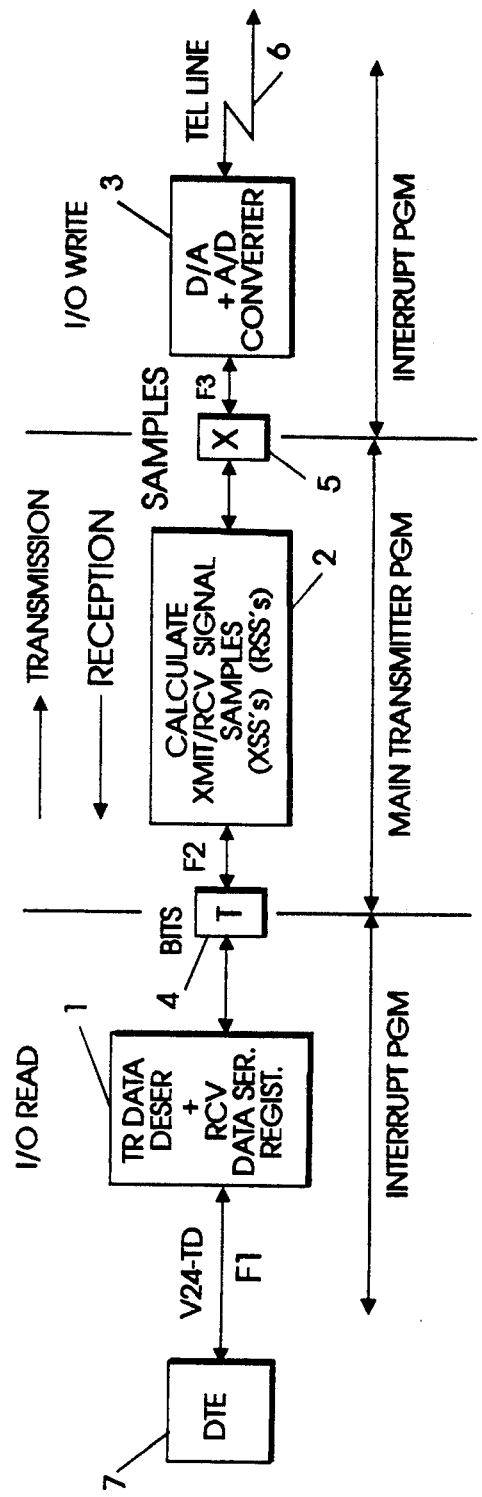
FIG. 2 represents the operation principle of the microcoded transmission and reception function of a modem.
Figure 3:
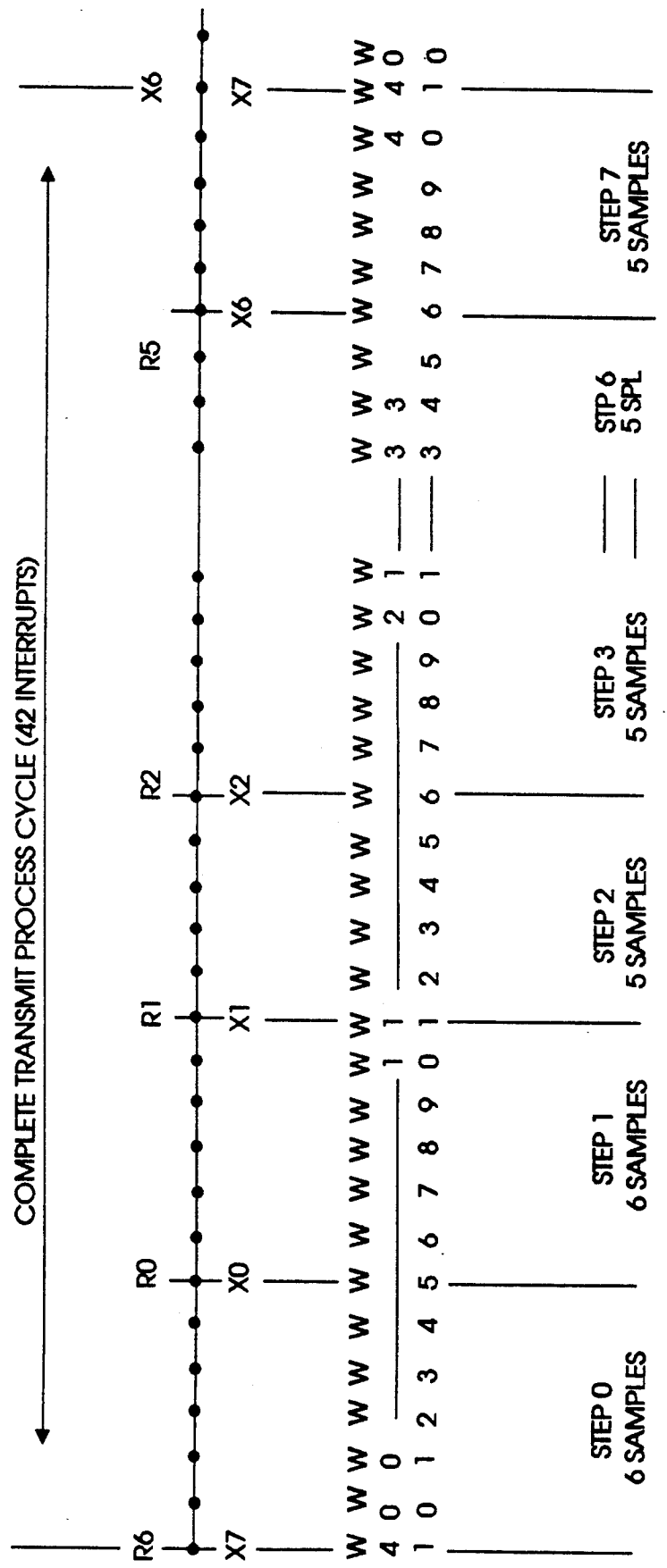
FIG. 3 represents the clocking signals involved in a transmission or reception process cycle of the modem, the interrupt program which is always in synchronism with the data stream.

As schematized in FIG. 2, the transmission microcoded function consists of:

1. Reading through deserializing register (1) the Transmit Data (TD) bits provided on V24 interface of the DTE (7) and storing them into a transmit data buffer (4), which corresponds to an interrupt type program segment.

2. Reading a byte of data from buffer (4), and computing, from said byte of transmit data a set of transmit signal samples and storing them into a transmit samples buffer means (5). This is done with a lower priority level.
3. Writing a set of transmit signal samples into the Digital to Analog and Analog to Digital converter D/A, A/D (3) which in case of a transmission, converts them into the analog signal sent over the telephone line (6). This last part of a transmission function is again a high priority task initiated by an interrupt signal generated by a segment of interrupt program.

Similarly, the reception microcoded function consists of:

1. Reading the digital samples provided by the Analog to Digita converter (3) after reception of a signal from the telephone line (6), and storing said samples into a receive samples buffer means (5). This corresponds to an interrupt type program segment.
2. Computing, from a set of digital receive samples, a set of receive data bits, and storing them into a receive data buffer means (4). This is done with a lower priority level.
3. Writing a byte of receive data bits into a receive data serializing register (1). This last part of a reception function is again a high priority task initiated by an interrupt signal generated by the interrupt program.

It will now be returned to the case of a transmission function.

The description of the mechanism is based on the 19200 bps rate which is the most complex. Other bit rates such as 14400, 9600 obey to the same principles but have less constraints in terms of data and signal samples buffering and process segmentation.

Periodically, at a constant frequency f1 derived from the serial transmission data rate the Interrupt program deserializes 8 bits of transmit data (TD) at a time by reading the V24 interface Deserializer Register (1) then stores these data into a buffer (4) called TXDAT (T in FIG. 2).

The Main Transmitter program, when requested, by a request generated at frequency f2 by the Interrupt program (as explained farther) calculates a set of transmit signal samples from the oldest set of 7 transmit data bits found in TXDAT buffer. These samples are then stored into the XSAMPL buffer (5) (X in the figure).

Periodically, at a constant frequency f3 the Interrupt program writes one transmit signal sample from XSAMPL buffer (5) into the D/A converter I/O register (3) and transmits it to the telephone line (6).

It is to be noted that the Interrupt program generating interrupts is divided into two parts, the transmit and the receive parts. Each part is selected according to the type of the interrupt, i.e. according to the direction of the data flow within the modem: from DTE (7) to telephone line (6) (transmit operation) or from telephone line (6) to DTE (7) (receive operation). Preferably, according to the data flow direction, two independent PLO's can be used to generate interrupts. Due to the symetry mentioned above, only the interrupt program related to the transmit direction will be described.

INTERRUPT TRANSMIT PROGRAM ACTIVATION AND PROCESS

The Interrupt Transmit program is driven by transmit interrupts I0 to I41 (FIG. 4) which are produced by a PLO at the frequency of 14400 interrupts per second. There is one interrupt every 69.4 microseconds.

The activation and process of the interrupt transmit program and main transmit program will now be explained in greater detail in relation to FIGS. 3, 4 and 5 while the involved hardware and data flow will best appear in FIGS. 6 and 7.

Every 6 interrupts I0, I6, I12, . . . i.e. every 416,6 us, :f. (6 'x' 1 over 14400 = 1 over 2400):ef. a read signal (R0, . . . R6) is generated by the Interrupt program, which reads the V24 interface deserializer register (1). If the incoming data rate is 19200 bps, 8 bits of transmit data are read in parallel at each Read signal, (which makes a constant frequency f1 = 2400 read operations of 8 bits, per second), and stored into the TXDAT circular buffer (4) which can contain 7×8 = 56 bits (FIG. 6). The 7 RAM positions of 8 bits each are controlled by a XDIN pointer (8).

Each time an 8-bit string of transmit data is stored, the XDIN pointer is incremented by 1 modulo 7.

Thus, 7 read-store operations are needed for filling completely the TXDAT buffer (4).

Figure 6:
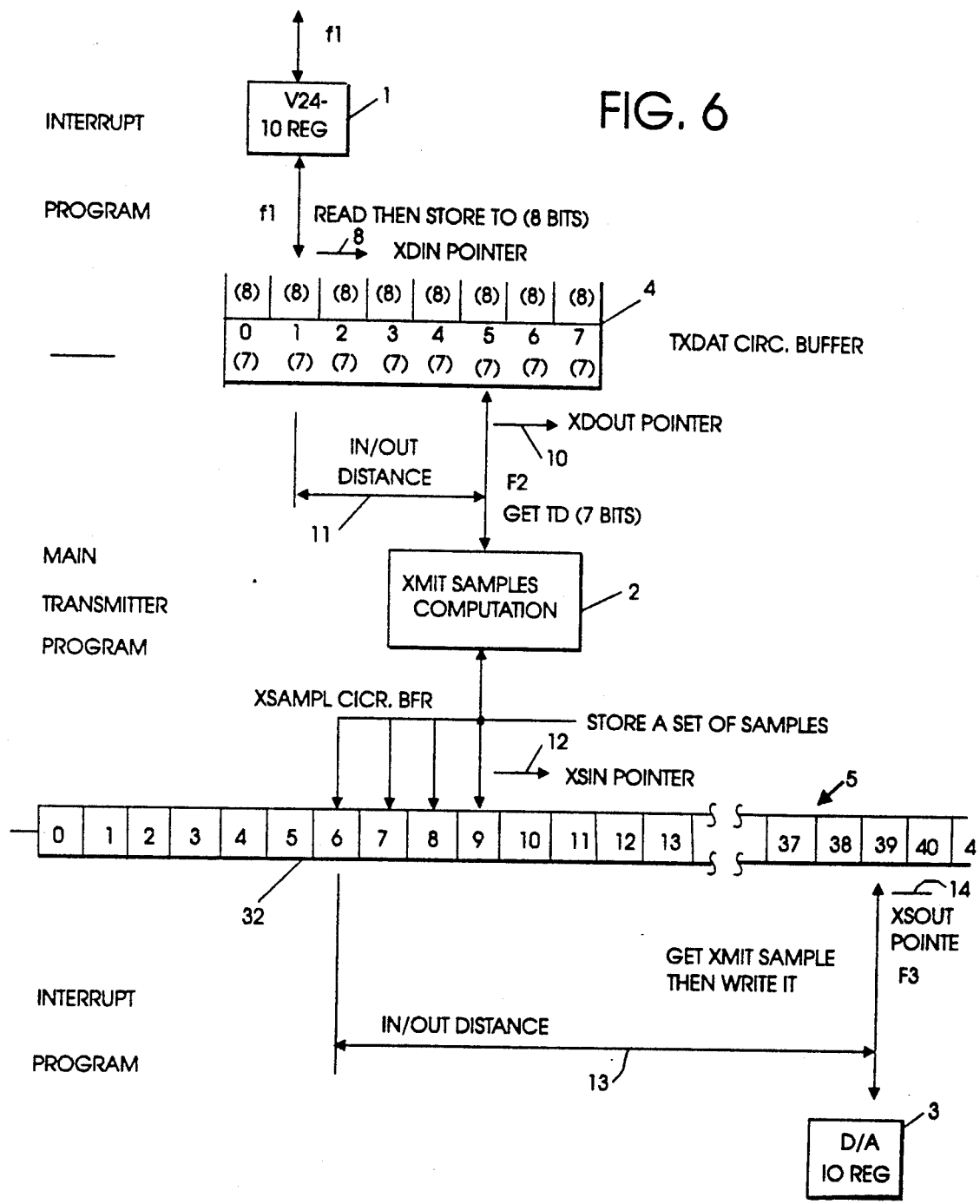
FIG. 6 represents the data flow through a modem and the principle of data samples buffering and transmission.

With a certain delay (11) schematized in FIG. 6 by the IN/OUT distance between the XDIN pointer (8) and the XDOUT pointer (10), the data stored in TXDAT circular buffer (4) are transmitted by groups of 7 bits, to the transmit samples computation unit (2). This transmission occurs with a frequency f2 which can vary since the delay (11) is variable, but over a long period of time, f2 corresponds to a data flow of 19200 bps, or 2743 transmission operations of 7 bits, per second.

For each group of 7 bits, a set of transmit samples are computed within computation unit (2), according to low priority tasks of the main program. Said samples coded on 16 bits each are loaded by groups of 5 or 6 into a XSAMPL circular buffer (5), at RAM positions indicated by a XSIN pointer (12). Upon transmit interrupts generated by the high priority interrupt program at PLO rate (14400 interrupts per second), the samples are read out one by one from the XSAMPL buffer (5) according to the position of pointer XSOUT (14), and written into D/A converter I/O register (3), from where the data are converted and transmitted to the telephone line.

The XSAMPL circular buffer is 42 RAM positions long and is controlled by the XSOUT pointer which is incremented by 1 modulo 42 at each sample handling. Every time a set of samples has been read out from the buffer (a set is composed of 5 or 6 samples for reasons explained below), a request Rn (n=0 to 7), or in case of transmission, Transmit request Xn is posted to signal to the Main Transmit program it is time to fill up the XSAMPL buffer with a new set of samples.

Thus, the Main Transmit program is request-driven. Its tasks are dispatched every time the scheduler finds a posted 'Xn' request, as shown in the bottom of FIG. 4. Transmit requests are posted as seen before by the Interrupt Transmit program.

8 transmit requests X0 to X7 are needed to empty completely the TXDAT buffer. Each transmit request Xn causes the entry of the main transmit program into a corresponding task n (or step n) of the transmit process cycle.

TRANSMIT PROCESS CYCLE

As explained before in relation to FIG. 3, the transmitter process works according to a cycle which lasts a time corresponding to 42 interrupt-intervals (which corresponds to 8 bauds times). During this cycle 56 bits of transmit data are read from V24 interface register (1) (7×8 bits) and 42 transmit samples are written into the D/A converter I/O register (3).

It is to be noted that the number of samples referenced (32) depends of the mathematical algorithm used by the computation unit (2) of the modem, and another number of samples, as well as another grouping of them into steps of the transmit cycle is conceivable without affecting the invention. Since 42 is not a multiple of 8, it has been chosen to split the process cycle into two steps (S0, S1) involving 6 samples and six steps (S2, S7) involving 5 samples.

At each step execution, an Xn request is posted, 'n' corresponding to the step number (X0 to X7). These requests are used for Main Transmit program tasks scheduling. To each Request corresponds a given task of the main transmit program, and to each interrupt (I0 to I41) of the interrupt program corresponds a given segment of said interrupt program.

Therefore, the interrupt program contains 42 elementary segments. As a matter of example, as can be understood from FIG. 4, segment 0 is initiated by interrupt I0 and is defined by the following successive tasks:

- generating a read signal R0 causing the reading of 8 bits from the deserializer register (1);
- reading a sample W0 from sample buffer (5) and writing it into D/A converter I/O register (3), for transmission over the telephone line;
- posting a transmit request X0 for calling the main program to execute transmit task 0;
- preparing next interrupt program segment entry (i.e. segment 1).

Thus, consecutive to the next interrupt, I1, the interrupt program will go directly to segment 1. Segment 1 contains only the task of: reading a sample W01 from sample buffer (5) and writing it into D/A converter I/O register (3). All the remaining segments of the interrupt transmit program are of one of the previously described types.

Of course, when all the interrupts I0 to I41 of a process cycle and the corresponding segments have been executed, a new cycle begins. That means that the segment corresponding to I41 prepares the entry into the segment corresponding to I0.

In summary, a complete transmit process cycle consist in:

42 writings into the D/A converter (3) of previously calculated transmit samples.

8 sequential postings of 8 transmit requests (X0 ... X7), causing the execution of 8 sequential calculation tasks of a set of 5 or 6 transmit samples per task, each task requiring a string of 7 data bits as input. Said bits are read out from TXDAT buffer (4) data bytes provided by the V24 deserializer register (1).

7 sequential readings (R0, ... R6) of new data bytes provided by the V24 deserializer register (1).

The calculation tasks of the main transmit program, to which it is referred above, consist in:

getting a set of 7 data bits from the transmit data circular buffer TXDAT (4), said set being taken from a location indicated by XDOUT pointer (10) (FIG. 6).

using said set of 7 data bits, for computing a set of 5 or 6 (according to the task number, as explained above) transmit signal samples.

storing said set of 5 or 6 transmit signal samples into the Transmit Sample buffer means, i.e. Circulate buffer XSAMPL (5), at a location indicated by XSOUT pointer (14).

Figure 4:
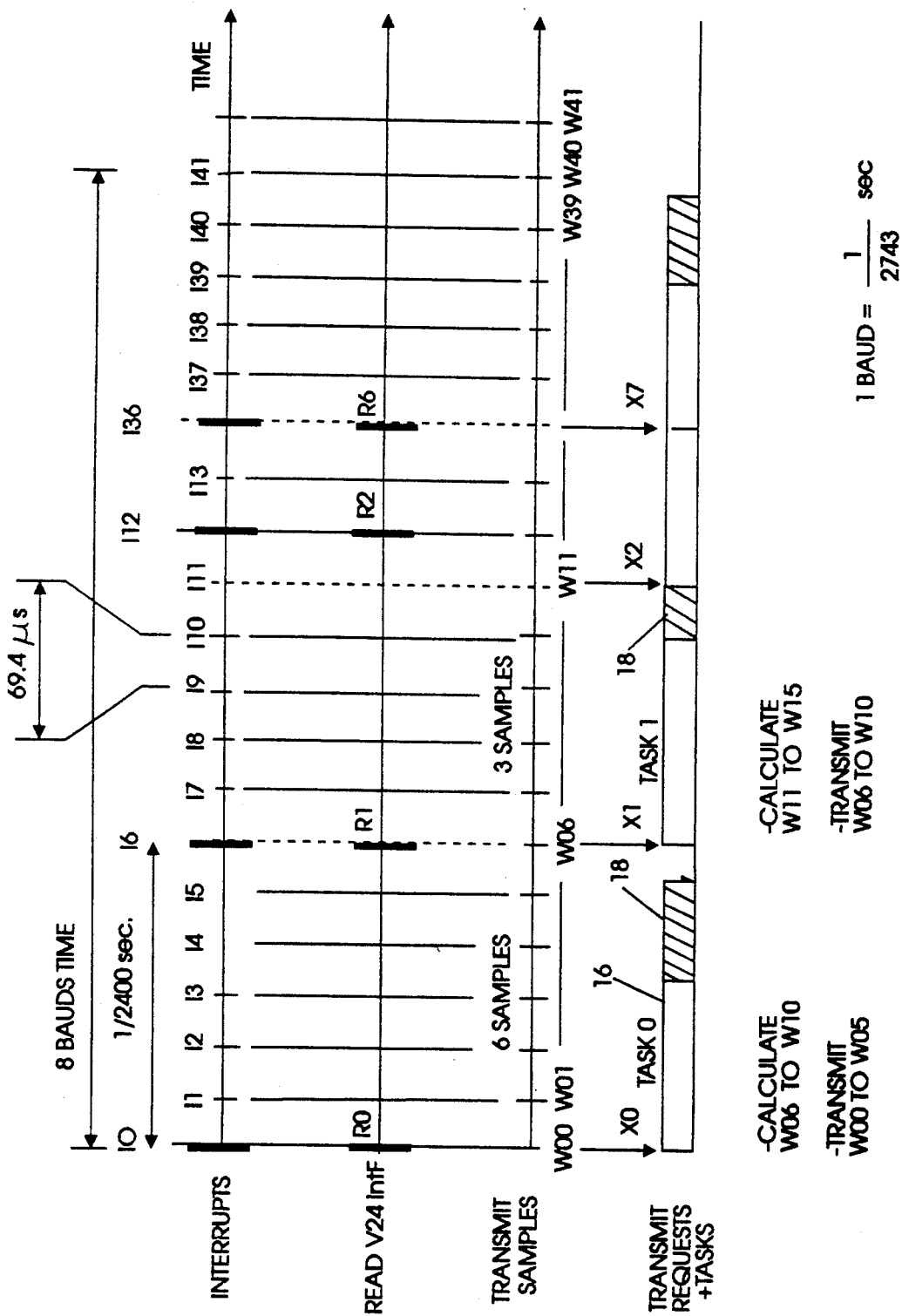
FIG. 4 represents a more detailed view of a part of process cycle represented in FIG. 3, including the synchronous execution of transmit tasks.

The bottom of FIG. 4 represents the timing of the tasks performed by the main transmitter program, in a "best case" situation, which is the normal situation encountered in prior art modems. In this situation, each transmitter program task as described above (blank areas 16) is triggered by the corresponding transmit request Xn, and is immediately executed and finished before the next transmit request Xn+1 occurs. The samples W6 to W10 computed during task 0 will be transmitted to the D/A converter during task 1 and so on.

However, as explained in the preamble of the description, this constraint is unacceptable for high speed and sophisticated modems providing asynchronous functions (CNM, monitoring, etc . . . ) which have to be scheduled between two synchronous transmit tasks. In a modem, transmit task processes (herein described) as well as receive task processes are based on the Baud-time. Normally with a simple scheduling mechanism any task process should be ended before the following Baud starts. In that case a baud-time overrun should be detected every time a task Tn is still executing when the request Xn+1 is posted. This situation is generally due to a task computing overload, which can be due to asynchronous process executions, or to synchronous process executions that are too long, due to difficult transmission conditions on the line, involving more computing. The timing of such asynchronous functions is schematized in FIG. 4 by shaded areas (18).

It is easy to see from that figure that as soon as an asynchronous task (18) exceeds the time available before synchronous execution of the next transmit task (16), an overrun condition is met, and the data delivered by the modem loose every meaning.

Two theoretical solutions to that problem would be:

1. increase the performance of the main transmit program processor, in order to reduce the time needed to perform both the synchronous and asynchronous functions. However, this reveals expensive.
2. increase the buffering space between incoming and outgoing data bits at transmit data buffer TXDAT(4) level, and between stored and transmitted samples at Transmit Sample Buffer XSAMPL (5). This, however, would increase the overall transit time of information between the modem I/Os, which is not acceptable for a high performance modem.

According to the present invention, a third way is provided which allows more flexibility in the execution of synchronous and asynchronous tasks by creating free processing windows to be used by asynchronous tasks, without affecting the overall transit time between data entry and output.

Thanks to an improved mechanism described below, transient task computing overloads are accepted under defined limits. These transient overloads are normal (long initializations, specific algorithms executed at receiver synchronization time, port configuration changing on the fly when receiving a training sequence containing a data rate change indication . . . ) and should be taken into account.

According to the invention, overruns are detected only when accumulated task overloads produce a global delay such as more than a given number of requests wait for servicing. The asynchronous tasks are defined and scheduled in such a way that this type of overruns should never occur in normal conditions (partitioning of asynchronous tasks of limited lengths).

Anyway in average the rule 'one synchronous task process per baud-time' is still true with the proposed mechanism. Computing cycles needed for accepting task overloads are stolen from the asynchronous programs, which is not detrimental for them.

Figure 5:
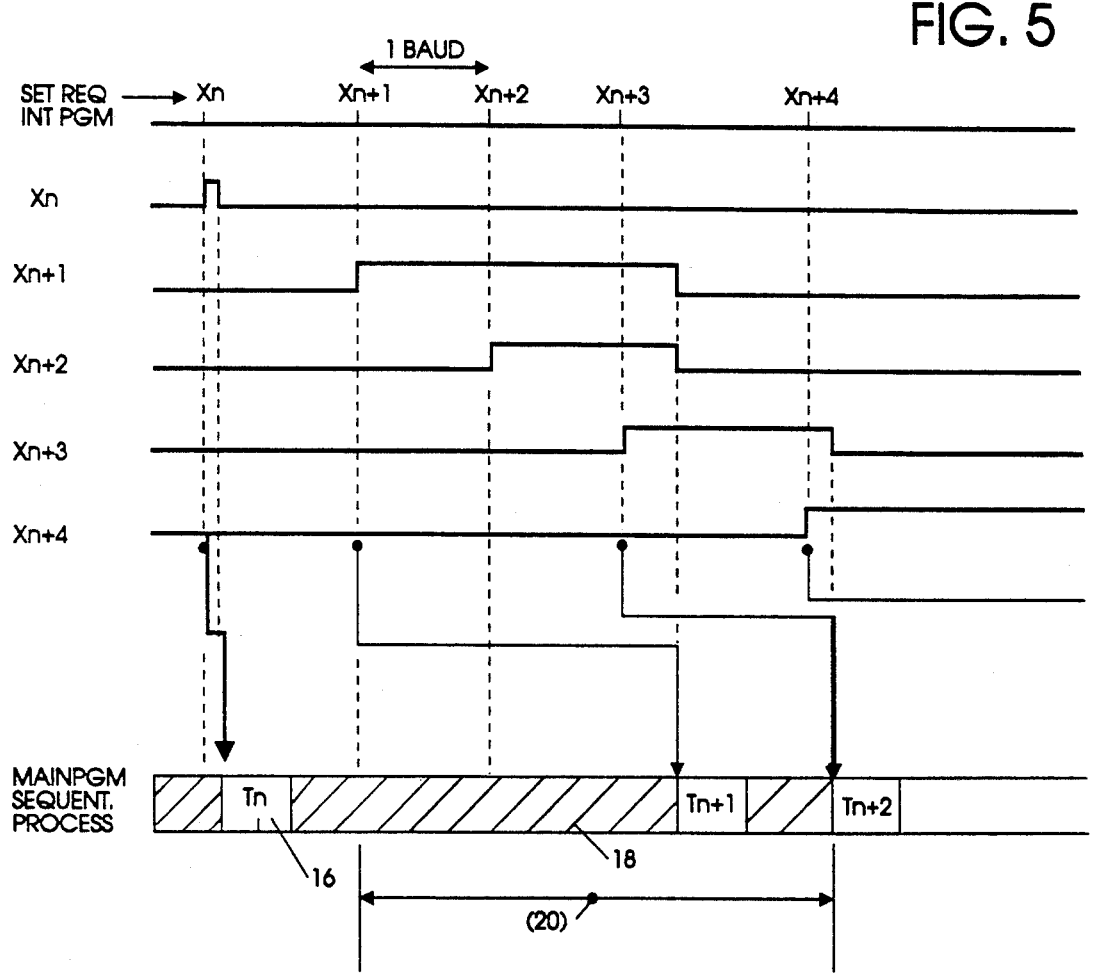
FIG. 5 represents a flow diagram wherein the interrupt program and the main program work with a transient loss of synchronism, according to the invention.

The principle of the sequential and delayed execution of processes of the main transmit program is best illustrated in FIG. 5.

As the processing of modules of the main program (transmitter program, receiver program, monitoring, . . . ) is executed sequentially by the microprocessor, the execution of the main transmit program may be delayed relatively to the time at which the transmit request has been posted. A given request signal (Xn, Xn+1, . . . ) remains in a high state until the execution of the corresponding task (Tn, Tn+1, . . . ) begins. As a matter of example, while task Tn is executed quite immediately after transmission request Xn, the task Tn+1 is executed with a delay (20) relatively to request Xn+1. Since the delay (20) is greater than one baud time, or interval between two consecutive requests, the task Tn+1 is even executed after request Xn+2. This situation, which would correspond to an overrun in a modem according to prior art, corresponds according to the invention, to an acceptable delay or elasticity between the execution of two consecutive tasks of the main program. This delay creates a free processing window, during which an asynchronous or a transient synchronous task may be scheduled and executed.

As a consequence, the execution of the tasks of the main program becomes, thanks to the invention, pseudo synchronous relatively to the requests Xn, which are generated in synchronism with the interrupt program, as appears in FIG. 4.

It is to be noted that the delayed scheduling of task Tn+1 relatively to request Xn+1 (in FIG. 5) is possible only within reasonable delay values, at least in a modem, wherein the transit time of information is critical.

In the farther described implementation of the scheduling mechanism, the maximum delay (20) between a request and the corresponding task execution will be assumed equal to 3 baud times, or intervals between consecutive requests. And the appearance of a greater delay will exceed the allowed elasticity and cause an overrun situation, which must be recognized.

That means that when the scheduler finds 4 pending requests, an OVERRUN condition is reached and the modem is reset, causing a break in data transmission and avoiding non recoverable data errors.

It is further to be noted that one of the advantages of the scheduling mechanism allowing elasticity periods between execution of consecutive tasks, resides in that the execution delays are used only when necessary, i.e. when a relatively long asynchronous process execution (18) or a transient synchronous task has to be scheduled. After a certain number of subsequent pseudo-synchronous task executions, the normal situation shown in the bottom of FIG. 4, is recovered.

Finally, the scheduling mechanism according to the invention allows an optimal use of processing time, with a minimum of processing power overhead.

The action of the scheduling mechanism according to the invention on the data-flow of the modem is best apparent in FIG. 6 showing the respective positions of pointers XDIN (8) and XDOUT (10). XDIN pointer materializes the location of a byte of data stored into the TXDAT circular buffer by the interrupt program. This happens at a constant frequency f1=19200 bps, or 2400×8 bits per second. XDOUT pointer materializes the location of 7 bits of data needed at a time by the transmit samples computation unit (2) of the modem. It is to be noted that the fact that 7 bits are needed is a matter of choice depending on the computation algorithm used in the modem. If another number of bits was needed at a time, it would only affect the update frequency of pointer XDOUT, but not the principle of the delay between interrupt program requests and main program tasks execution. In the figure, subject delay is materialized by IN/OUT distances (11) and (13). Its significance is that the Interrupt program and main transmit program should not work in the same area of TXDAT buffer (4) or of XSAMPL buffer (5). Each program handles these common buffers by means of its own IN/OUT pointers. These pointers are initialized in such a way the "distance" between their values prevents from data overruns in normal conditions.

The progression rate of XDIN and XSOUT pointers used by the Interrupt program is constant.

For XDIN, this rate is equal to 2400 displacements of 8 bits per second, which corresponds to a 19200 bps data rate. For XSOUT, the rate is equal to 14400 digital samples sent to D/A converter (3) per second.

Due to the 'elasticity' caused by the scheduling mechanism, the progression rate of XDOUT and XSIN pointers used by the Main Transmit program is not constant. Nevertheless in AVERAGE the progression rate of these pointers is EQUAL to the progression rate of the pointers used by the Interrupt program. Elasticity without any overriding between pointers values is allowed thanks to the synchronous tasks scheduler (30) described farther, which allows the operation of the scheduling mechanism.

FIG. 7 shows a bloc diagram of the modem, or more generally of the communication system wherein the scheduling mechanism of the invention is used. In its most general configuration, the communication system includes synchronous I/Os (22) which, in case of a modem, consist of the V24 I/O serializer and deserializer register (1) D/A converter I/O register (3) represented in FIG. 6.

The I/O operations (i.e. receive or transmit data or samples in case of a modem) are performed upon interrupts and timings provided by a synchronous program (24), called the interrupt program for a modem.

The data are buffered in both directions into a data buffer (26), which regroups the TXDAT buffer (4) and XSAMPL buffer (5) shown in FIG. 6 in case of a modem. TD and XS refer to transmit data and transmit samples. The dotted arrows correspond to a receive flow.

A pseudo-synchronous program (28) (i.e. the main transmitter/receiver program is case of a modem) performs tasks using the buffered data, according to a task scheduling provided by a scheduler (30). Therefore, said scheduler (30) scans the tasks request provided by the synchronous program (24), each normally synchronous task being scheduled within a controlled delay relatively to the corresponding request.

In the following, two inventive implementations of the scheduler shown in FIG. 7, will be described. The description is being made under the assumption that the communication system is a modem, without affecting the generality of the invention.

Figure 8A:
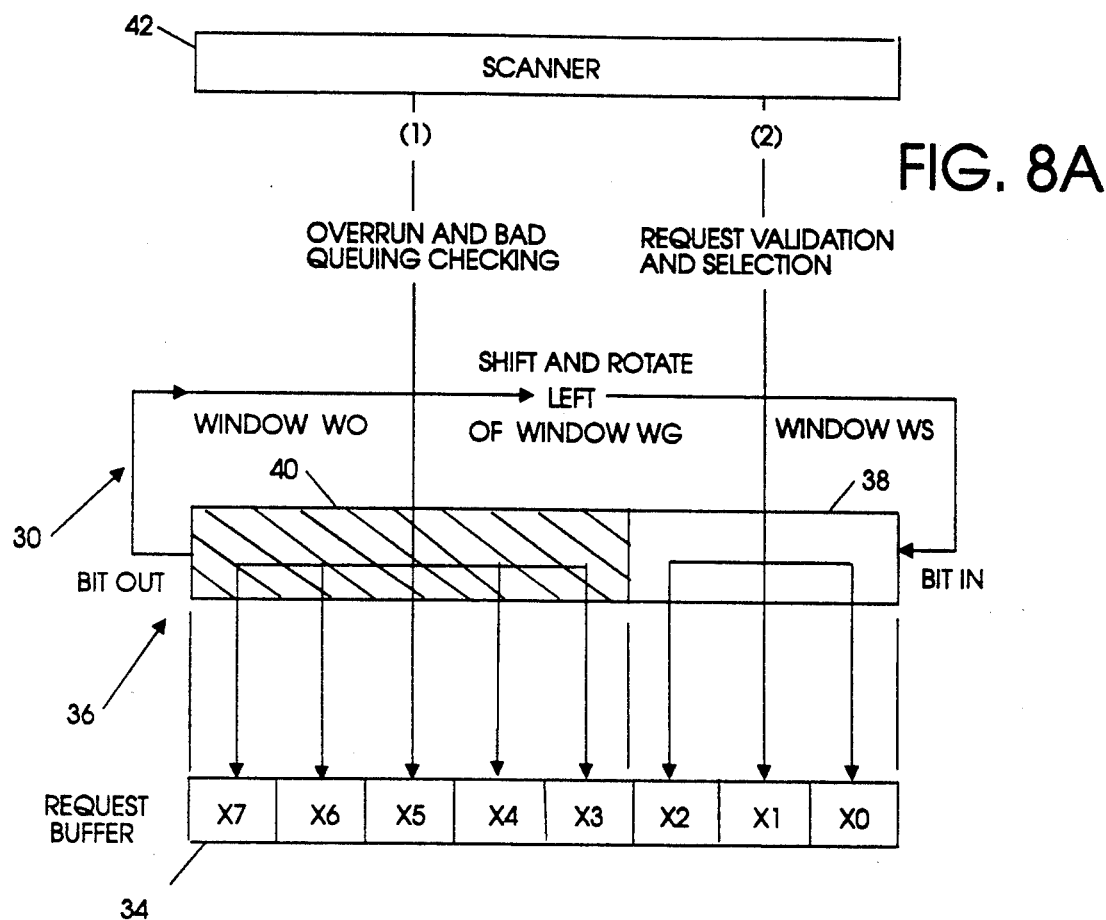
FIG. 8A represents the basic structure of the scheduler shown in FIG. 7, with a request buffer being in a first position.
Figure 8B:
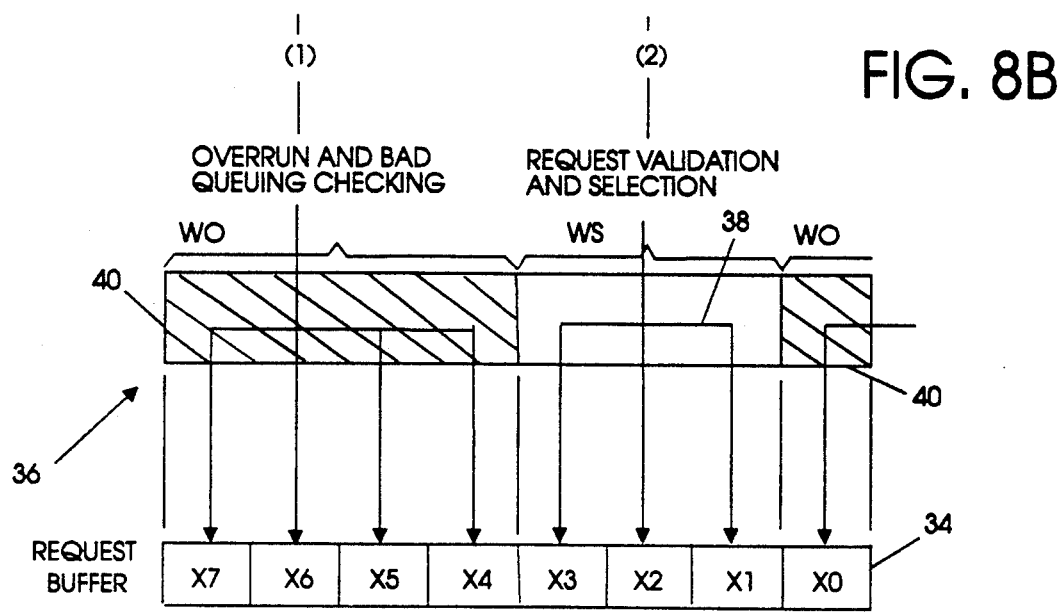
FIG. 8B represents the scheduler shown in FIG. 7, the request buffer being in a second position.

The principle of the implementation of the task scheduler is described in relation to FIGS. 8A and 8B. A first hardware implementation of the scheduler according to the principle described in FIGS. 8A, 8B is described in relation to FIGS. 9 to 12, while an even preferred implementation involving a microcoded decision table, is shown in FIG. 13.

As shown in FIG. 8A, the scheduler (30) consist of:

One circular 'Request buffer' (34), 8 bits long. Each request bit -X0 to X7- relates to a given task of Main Transmit program process.

One 'Global Window' (36) -WG- 8 bits long. It is composed of two adjacent windows: a select window WS (38) and an overrun window WO (40):
  'WS' window, 3 bits long, used for request selection (3 bits because only a maximum of 3 pending requests are authorized in relation to the maximum delay between values of IN/OUT pointers of a same buffer).
  'WO' window, 5 bits long, used for overruns checking.

A scanner (42), which frequently scans the content of the Request Buffer through WS and WO windows. This scanner is activated after each execution of a main program task.

FIG. 8A shows the window positioning at initialization time and at each beginning of a transmit process cycle.

The operation of the scheduler shown in FIGS. 8A, 8B is the following:

At initialization time:

The WS window (38) is aligned on bit X0. The WO window (40) is aligned on bit X3. WS and WO windows are adjacent subsets of WG window. All bits of the Request Buffer (34) are covered by both windows.

WS covers X2-X1-X0 request bits.

WO covers X7-X6-X5-X4-X3 request bits.

In parallel, the Interrupt program is prepared in order to post the XO request first (then X1, X2, X3, X4, X5, X6, X7, X0, X1, . . . are posted sequentially).

When the transmit process is running:

Every time the scanner (42) is given the control it first looks at the Request Buffer through the WO window, corresponding to an overrun detection. All bits should be found set to zero. Any value other than '00000' means OVERRUN or BAD request queuing and causes generation of a MODEM RESET signal (there are more than 3 pending requests).

Then the scanner looks at the Request buffer through the WS window (38) for a valid combination of bits. Any combination presenting non-consecutive bits ON is declared invalid and causes a MODEM RESET.

Valid combinations are given below, with their respective meanings:
  '000' no request active, wait.
  '001' 1 active request, schedule related process.
  '011' 2 requests (rightmost Xn request is given the priority).
  '111' 3 requests (rightmost Xn request is given the priority).

Invalid combinations are given below, with their respective meanings:
  '010' bad request queuing, rightmost bit OFF
  '100' bad request queuing, rightmost bit OFF
  '101' bad request queuing, non-consecutive bits ON
  '110' bad request queuing, rightmost bit OFF When the combination is 000, nothing is done. When valid combinations are seen through WS and WO windows:

The Main Transmit program task corresponding to the rightmost i.e. the oldest request bit ON under WS is selected, The corresponding selected request bit is set to zero into the Request Buffer and The WG Global Window is shifted and rotated left by 1 position.

Then the process continues the same way as long as there are active requests in the request buffer (34).

For example, in the FIG. 8A, after X0 request has been selected and Request Buffer shifted the new positioning is, as shown in FIG. 8B:

WS (38) window covers X3-X2-X1 request bits of buffer (34).

WO (40) window covers X0-X7-X6-X5-X4 request bits of buffer (34).

It is to be noted that the dimension of the windows and Request buffer are determined by the application. According to the needed 'elasticity' and/or the number of tasks, these dimensions can easily be changed. For example, in a 14400 bps modem the Request buffer and 'WG' Global window would be 4 bits long, the 'WG' selection window 2 bits long and the 'WO' overrun checking window 2 bits long.

Figure 9:
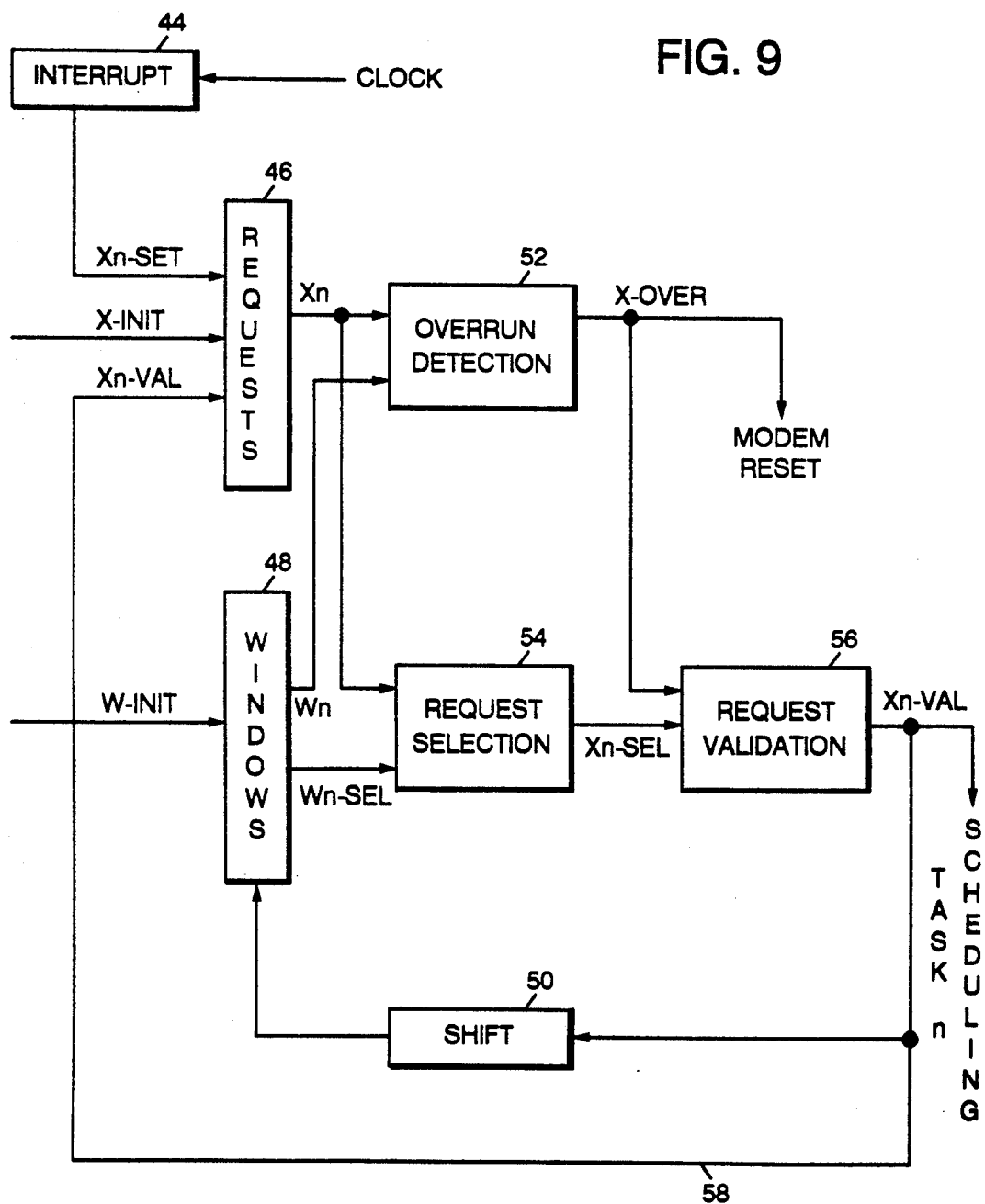
FIG. 9 represents a schematic view of the scheduler logic.

FIG. 9 describes the hardware blocks of a first implementation of the scheduler (30). The different blocks are:
  an interrupt Program logic named 'INTERRUPT' (44)
  a request setting logic named 'REQUESTS' (46)
  a windows select logic named 'WINDOWS' (48)
  a shift and Rotate logic named 'SHIFT' (50)
  an overrun Detection logic named 'OVERRUN' (52)
  a request Selection logic named 'SELECTION' (54)
  a request Validation logic named 'VALIDATION' (56)

REQUESTS are set ON in dedicated places of the request buffer by means of the INTERRUPT logic (44). Then, thanks to WINDOWS logic (48) these REQUESTS are analyzed for OVERRUN detection, SELECTION and VALIDATION of the requests. A validated Request activates the SHIFT logic (50) and the SCHEDULING of the appropriate TASK.

The SHIFT logic (50) when active shifts and rotates by 1 bit position the WINDOWS Buffer (36). Activation of SHIFT signal is done from Request VALIDATION logic output.

Also, when a task n has been scheduled, the information is provided on wire (58) to the requests setting logic (46) in order to reset the corresponding request.

Figure 10:
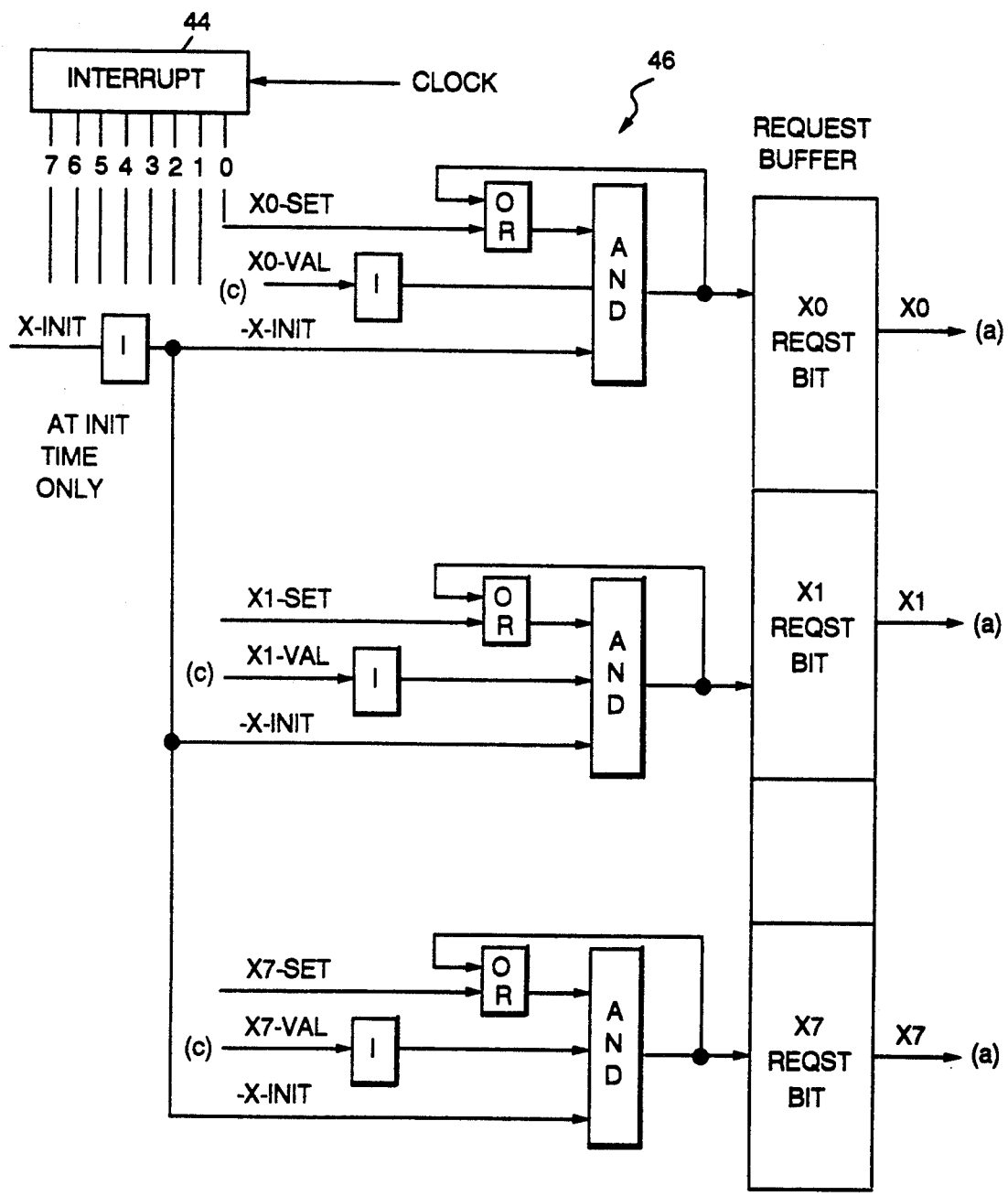
FIG. 10 represents in greater detail the requests setting logic shown in FIG. 9.

FIG. 10 describes the REQUEST setting logic (46).
  Inputs: X0-SET to X7-SET from INTERRUPT logic (44) for setting requests 'ON', X0-VAL to X7-VAL (C) from VALIDATION logic (56) for setting them 'OFF' and X-INIT signal active at initialization time for setting all request bits 'OFF'.
  Outputs: X0 to X7 request bits (a) to Request SELECTION (54) and OVERRUN logic (52).

Figure 11:
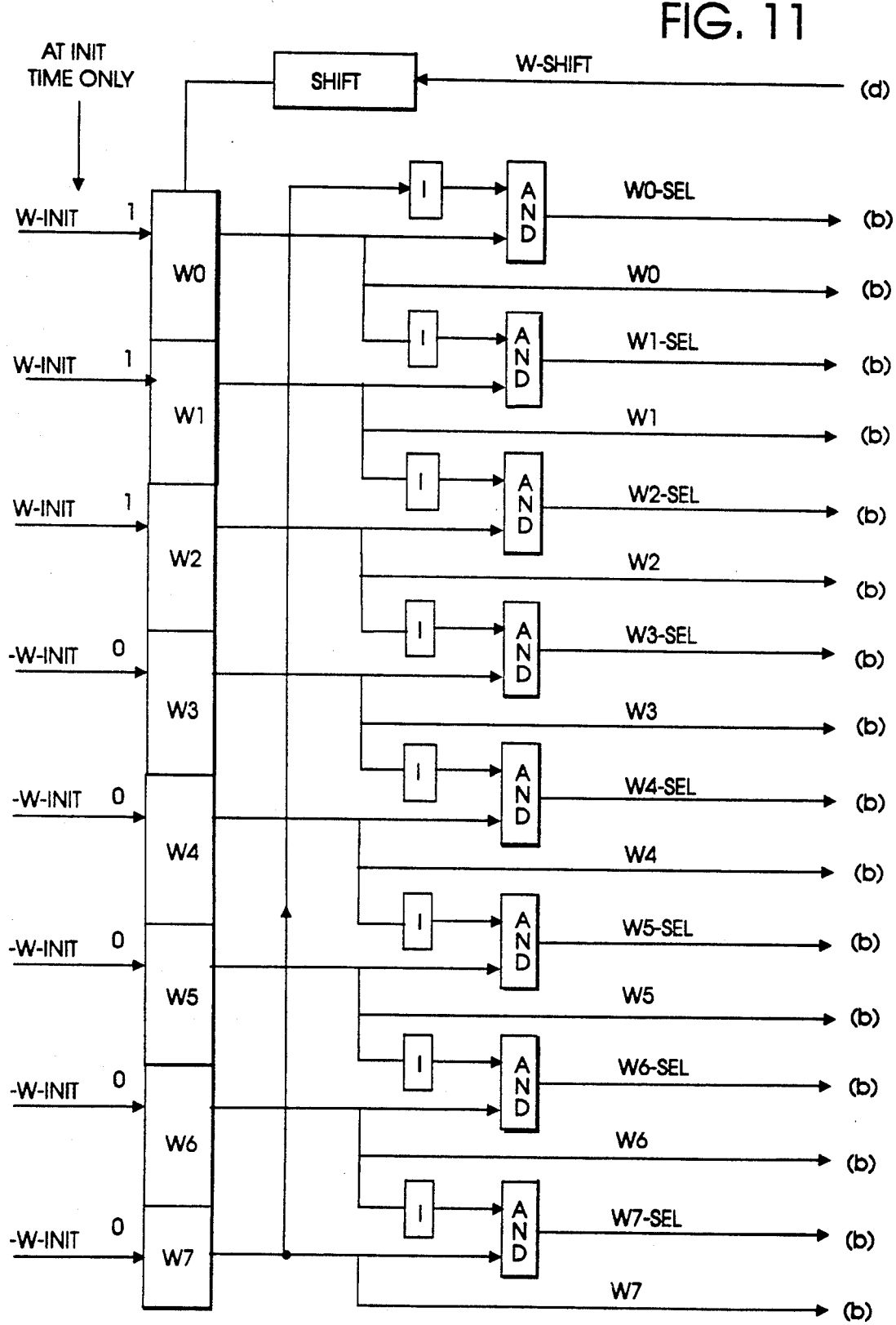
FIG. 11 represents in greater detail the windows select logic shown in FIG. 9.

FIG. 11 describes the WINDOWS Select Logic (48).

Inputs: Shift and Rotate signal from SHIFT logic (50). Every time W-SHIFT shift signal is turned 'ON', WINDOWS buffer (36) (8 bits) is shifted and rotated by one bit position. Another input -W-INIT-, active at initialization time, sets W0 to W2 bits to '1' and W3 to W7 bits to '0'.

Outputs: W0 to W7 bits to Request SELECTION (52) and OVERRUN (54) logics and W0-SEL to W7-SEL used to select the oldest Request bit under the Wn bits the value of which is "1".

One Wn-SEL bit at a time is ON among W0-SEL to W7-SEL bits.

Figure 12:
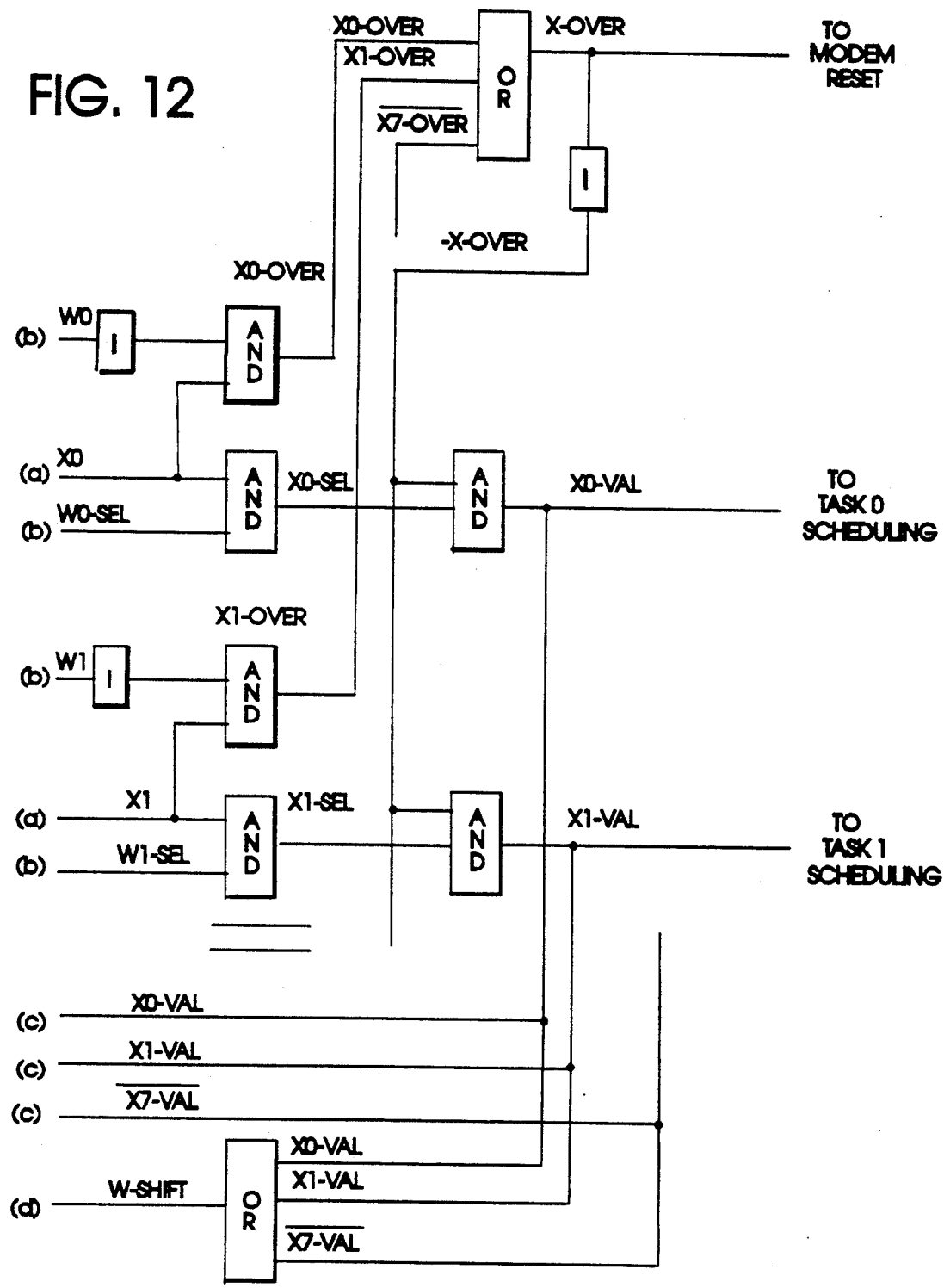
FIG. 12 represents in greater detail the overrun, selection and validation logics shown in FIG. 9.
Figure 13:
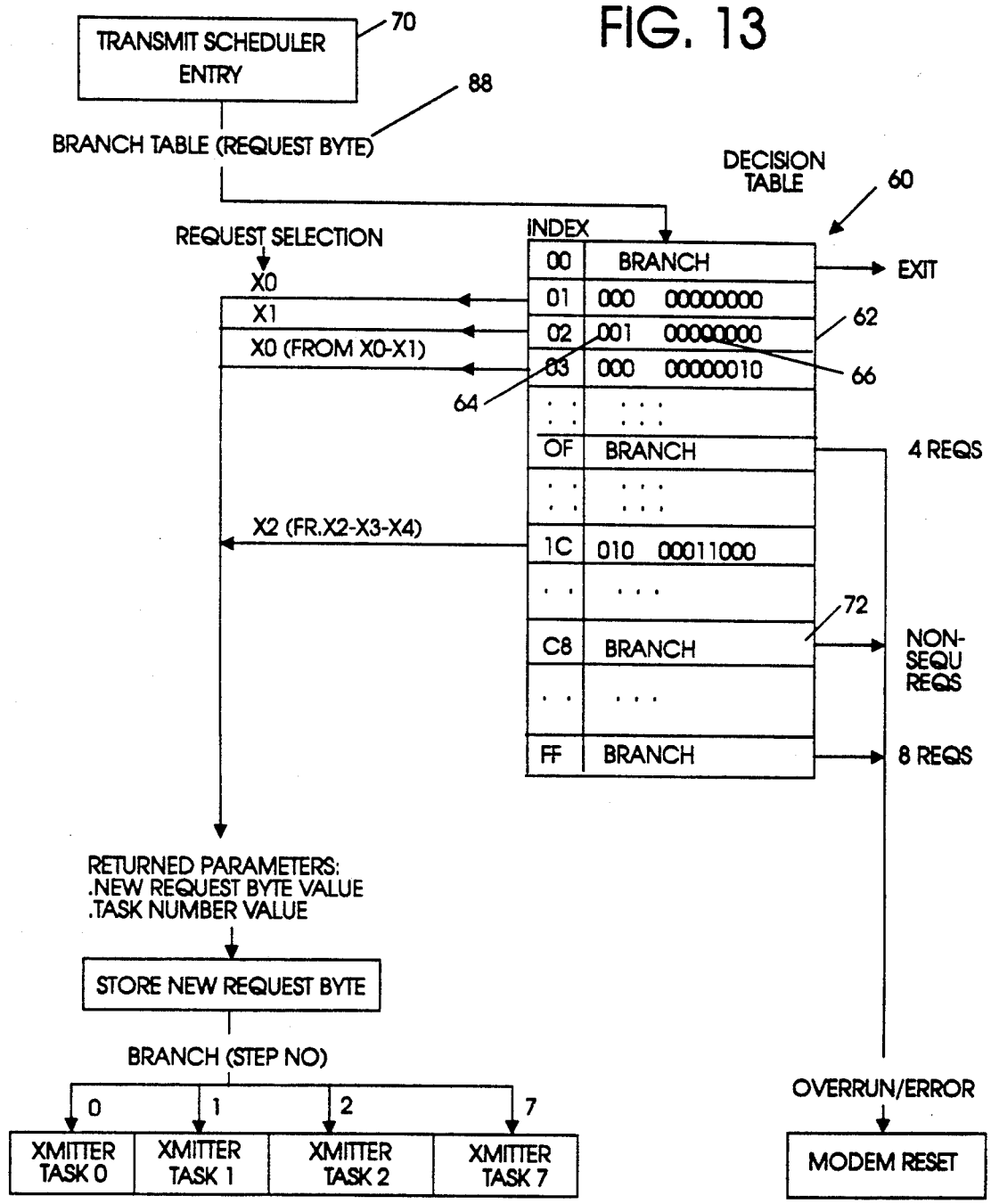
FIG. 13 represents a schematic diagram explaining the operation of another implementation of the scheduler and overrun detection.

FIG. 12 describes the OVERRUN (52), SELECTION (54) and VALIDATION (56) logics.

Inputs: X0 to X7 bits from REQUESTS logic (46), W0 to W7 bits from WINDOWS logic (48) W0-SEL to W7-SEL bits from WINDOWS logic (48).

Outputs: X0-VAL to X7-VAL bits for TASK0 to TASK7 scheduling and for REQUEST logic (46), X-OVER signal for Modem Reset, W-SHIFT signal for SHIFT logic (50).

Thus, the hardware implementation of the scheduler (30) allows the scheduling of the tasks T0 to T7 of a transmit process cycle of a modem. Indeed, a similar scheduler can be used for a receive process cycle, not described in detail herein due to the symetry between both cycles.

In relation to FIG. 13, an even simpler scheduler (30) based on a microcoded table look-up solution will now be described.

The principle used within this microcoded scheduler implementation consists in pointing with the value of the request byte (X7, X6, . . . X0) on a decision table (60) containing, for each particular request byte, a microcoded instruction. This instruction consists in: providing the task number (from 0 to 7) to be performed next, and providing the new value of the request byte, wherein the bit corresponding to the last serviced transmit (or receive) request has been set to zero.

The implementation of said microcoded decision table (60) and the use of it in order to have tasks scheduled, appears in FIG. 13.

The request byte (68) provided by the interrupt program (cf FIG. 7) to the transmit tasks scheduler entry (70) is used by the modem processor (not shown) as the operand for a BRANCH TABLE instruction. Thus, the request byte (68) is used as an index to the decision table (60). The table (60) may be implemented by a ROS (Read Only Storage) containing 256 (i.e. the number of possible values of the request byte) positions (62).

Each position (62) of the table contains an executable microcoded instruction, which, when executed, integrates the role of both windows WS (38) and WO (40) described in relation with the hardware scheduler, and provides two return parameters (64, 66) shown in the Figure. More accurately:

to each invalid value of the request byte (68) corresponds a table instruction containing a BRANCH to the "Modem Reset" program.
to each valid value of the request byte (68) corresponds a table instruction containing a LOAD of an 11 bits value into an internal register of the modem processor (not shown).

This 11-bits value contains two parameters (64, 66):
a transmit task number (n) coded on 3 bits, which corresponds to the request number Xn of the next transmit task to be scheduled.
an 8-bits value corresponding to the new request byte value, i.e. the request byte value wherein the request bit corresponding to the last executed task has been reset to zero.

As shown in FIG. 13, the new request byte value provided by table (60) is stored by the modem processor until the next scheduling operation asked by the interrupt program, as previously explained.

Besides, the transmit task value provided by table (60) is used to activate the corresponding task (Task 0, . . . Task 7) of the main transmitter program.

The operation of the task scheduler using the decision table (60) look-up will now be explained in more detail by the way of examples.

EXAMPLES OF REQUEST SELECTION VIA TABLE LOOK-UP

In the following examples, request bits of Request Buffer are numbered as follows, from the left to the right, X0 designated the oldest request received by the request buffer.

1or X7 1or X6 1or X5 1or X4 1or X3 1or X2 1or X1 1or X0 1or

1. Example where the Request byte contains B'00000110' (X'06'):

This means that X1 and X2 bits have been posted by the Interrupt program. The combination X2 X1 X0=110 is valid. The value is X'06' in hexadecimal. The Scheduler addresses the corresponding table instruction. This table instruction will load the binary value '001 00000100' in an internal register of the processor.

The Scheduler gets back the content of said register. In the returned binary value:
the 8 rightmost bits '00000100' represent the value which should update the Request byte. Only the request X2 bit is still present. X1 bit, the selected request, has been set to zero in the updated request byte.
the 3 leftmost bits '001' represent the transmit task number i.e. '1' corresponding to the request X1. When scheduled, the transmit task 1 checks that previous executed task number was '0'. If not, a branch is done to 'MODEM RESET' program.

2. Example where Request byte contains B'000011111' (X'0F'):

This means that 4 request X0 to X3 are active. Main Transmit program is late relatively to the Interrupt program. This is an OVERRUN condition.

The table instruction corresponding to the index value X'0F' contains a branch to 'MODEM RESET' program.

3. Example where Request byte contains B'11001000' (X'C8'):

This means 3 requests are active but an error has occurred somewhere since non-consecutive request bits are ON.

The table instruction corresponding to the index value X'C8' contains a branch to 'MODEM RESET' program.

4. Example where Request byte contains B'11000001' (X'C1'):

That means 3 requests are active. As the buffer is circular, bits ON are said consecutive. This combination is valid. The requests are X6, X7 and X0 (from oldest to newest).

The table instruction corresponding to the index value X'C1' contains a load of the binary value '110 10000001'.

In this binary value:
the 8 rightmost bits represent the value which should update the request byte. Only the request X7 and X0 bits are still present. The X6 request bit, the selected one, has been set to zero.

The 3 leftmost bits represent the task number i.e. '6' corresponding to the request X6. When scheduled, the transmit task 6 checks that previous executed task number was '5'. If not, a branch is done to 'MODEM RESET' program.

In order to set up the table (60) with the appropriate micro instructions, an algorithm using the following rules may be used.

1. Table instruction address '00' corresponds to an empty request buffer. No transmit task is to be executed. A BRANCH to EXIT is done and the scheduler waits for an active request.
2. Each table instruction the address of which corresponds to a Request buffer value with non-consecutive bits ON is setup with a branch to 'MODEM RESET' program.
3. Each table instruction the address of which corresponds to a Request buffer value with more than 3 consecutive bits ON is set up with a branch to 'MODEM RESET' program (this was the role of window W0 (40) in order implementation).
4. Each table instruction the address of which corresponds to a Request buffer value with less than 4 consecutive bits ON is set up with a LOAD of a 11-bits value where the 3 leftmost bits represent the number of the Task to be scheduled and where the 8 rightmost bits represent the new value to be stored into the circular Request buffer to clear the selected request bit.

The selected request corresponds to the right most bit in the group of consecutive bits ON (role of window WS (38).

The Sequencing integrity of the transmit tasks is controlled by comparing the number of the last executed task with the new proposed one. The valid sequence is 0, 1, 2, 3, 4, 5, 6, 7, 0, 1, 2, . . . .

The detection of a non-sequence causes a branch to 'MODEM RESET' program.

Finally, it is interesting to observe that one instruction of the decision table (60) performs all the functions of the scheduler: overrun detection, task request selection and validation.

Moreover, the SAME decision table can be used either for Transmit and Receive requests selection.

And the implementation of the functions is very simple. The tuning (elasticity) of the mechanism is easy by changing the decision table contents (windows dimensions).

It has been mentioned previously that the modem program is very sensitive to the computing load in microprocessor. As the scheduling of different tasks of transmit and receive processes is frequently executed, the computing load needed by this scheduling mechanism must be reduced to a minimum.

This goal is obtained thanks to the fast, simple and adaptive scheduling mechanism and scheduler according to the invention.

Further, the scheduling mechanism and scheduler according to the invention also provide for:
Overrun detection
Bad request queuing detection
Request Number selection
Request buffer update (dequeuing)
Transmit task dispatching

We claim:

1. In a communication system modem receiving data synchronously at a rate determined by a clock signal under control of a first, high priority computer program, said data being processed by a processor executing communication oriented tasks of a second computer program which generates resulting data for output synchronously with said clock signal by said communication system, said second computer program also comprising control tasks and having a lower priority than said first computer program, a computer implemented program execution scheduling process for scheduling processing and completion of said tasks of said second computer program in synchronism with said rate determined by said clock signal controlled by said first high priority computer program, including the steps of:

buffering in a data buffering means, sets of data bits received during a predetermined number of successive periods of said clock signal;

generating and storing sequential processing requests in a request buffering means when said sets of data bits have been buffered;

receiving and storing the sequential data processing requests generated by said first computer program, in said buffering means, said request buffering means comprising a number of successive storage locations, said number being higher than a number of sequential processing requests arbitrarily chosen to predetermine the threshold delay period;

scanning and reading the contents of said request buffering means to determine whether said request buffering means contains a number of said requests in its said successive storage locations which said number is higher or equal to said arbitrarily chosen number predetermining the threshold, and if said determination is true, generating an overrun condition signal, and if false, determining the next said sequential processing request to be processed; and starting the executing of communication oriented tasks operating on said sets of data bits buffered in said buffering means and resetting said stored sequential processing request corresponding to said task so that each said task is executed within a delay period relative to said corresponding processing request, thereby creating free processing windows of time for the executing of other tasks of said second program, said delay period being less than a predetermined threshold delay period so that no more than a predetermined number of said stored sequential processing requests may be pending and active at one time.

2. A computer program execution scheduling process according to claim 1, wherein:

said communication system is a modem comprising transmitting means including a transmit data deserializing means receiving serial data bits and storing parallel data bits to be processed by said communication system, a transmit data sample unit which computes data samples from said stored data bits, and a digital to analog converter which converts said data samples into an analog signal to be sent over a telephone line, wherein:

said first computer program comprises an interrupt control program which generates transmit data program processing requests calling for the transmission of said sets of data bits received, said interrupt control program further controlling the storing of said sets of data bits in a transmit data buffer portion of said data buffering means; and said second computer program comprises a transmitter main computer program task which sequentially reads said transmit data program processing requests made by said interrupt control program and, if a said program processing request is active, reading said set of data bits corresponding to said active program processing request from said transmit data deserializing means and computing said transmit data samples from said data bits and storing said transmit data samples in said transmit data buffer portion of said data buffering means within said controlled delay time period.

3. The computer program execution scheduling process as described in claim 2, wherein:

said scanning of said request buffering means is performed during a scanning window of time which comprises an overrun detection period of time and a selection period of time, which periods of time are shifted and rotated with respect to said request buffering means each time that a request is selected for processing, wherein said scanning further comprises:

analyzing the contents of said request buffering means within said overrun detection period of time for detecting that an overrun condition exists at a time when all said requests are active; and selecting and validating a processing request corresponding to the next said task to be executed when no said overrun condition has been detected.

4. The computer program execution scheduling process described in claim 2, wherein the scanning of said request buffering means includes:

determining the next said task to be executed and detecting said overrun conditions, which conditions, if met, cause a reset of said communication system by consulting a microcoded decision table.

5. The computer program execution scheduling process as described in claim 4, wherein:

said decision table contains, for each possible value of the contents of request buffering means, a position accessed by using the contents of said request buffering means as an index to said table, each position therein containing an executable, microcoded instruction providing, upon executing, when the contents of said request buffering means correspond to a valid combination, the following functions:

identification of the next said task to be executed by the second program, an updated value for said request buffering means, wherein the location within said request buffering means corresponding to the last executed said task is reset to a value which indicates that no active request is then stored in said location.

6. The computer program execution scheduling process as claimed in claim 5, wherein:

when the contents of said request buffering means corresponds to an invalid combination, execution of said microcoded instruction causes the executing of a modem reset instruction.

7. The computer program executing scheduling process according to claim 1, wherein:

said communication system is a modem comprising receiving means including an analog-to-digital converter, receiving an analog signal from a telephone line and covnerting said analog signal into digital data samples, a received data sample computation unit which computes received data bits from said digital data samples, and a serializing register connected to a receive port of a DTE interface for receiving the computed received data bits serially and providing them to said interface, wherein:

said first program comprises an interrupt program which generates receive data processing requests calling for the reception of sets of digital data samples received by said receiving means and which controls the storing of said sets of digital data samples in said data buffering means; and said second program comprises a main program which sequentially reads said received data processing requests and, if a processing request is active, reads said sets of digital data samples corresponding to said processing requests which are stored in said data buffering means; and which computes said sets of received data bits from said digital data samples and stores them in said data buffering means within said delay period.

8. The computer program execution scheduling process as claimed in claim 7, including:

receiving and storing receive processing requests generated by the interrupt program, in said request buffering means comprising a number of successive storage locations, said number being higher than a threshold number of sequential processing requests arbitrarily chosen to predetermine the threshold delay period.

9. The computer program execution scheduling process as claimed in claim 8, wherein:

said scanning means scans the contents of said request buffering means is performed during a scanning window of time period which comprises an overrun detection period of time and a selection window period of time which are shifted and rotated with respect to said request buffering means each time that a said request is selected to be processed, said scanning further comprising:

analyzing the contents of said request buffering means within said overrun detection period of time for detecting an overrun condition when all said requests within said period of time are active; and selecting and validating a processing request corresponding to the next said task to be executed if no overrun condition has been detected.

10. The computer program execution scheduling process as claimed in claim 8, wherein the scanning of the request buffering means includes:

determining the next said task to be executed and for detecting overrun conditions, which conditions if met, cause a reset of communication system by consulting a microcoded decision table.

11. The computer program execution scheduling process as claimed in claim 10, wherein:

said decision table contains, for each possible value of the contents of said request buffering means, a position accessed by using said request buffering means content as an index to said table, each table position containing an executable microcoded instruction providing, upon execution, when the contents of said request buffering means correspond to a valid combination, the following functions:

identification of the next said task to be executed by the second program;

an updated value for said request buffering means wherein the location in said request buffering means corresponding to the last said executed task is reset to a value indicating that no active request is stored in said location.

12. The computer program execution scheduling process as claimed in claim 11, wherein:

if the content of said request buffering means corresponds to an invalid combination, said execution of said microcode instruction causes execution of a modem reset instruction.

* * * * *